Feb. 7, 1956 F. KREIS 2,733,613
CHANGE SPEED GEAR FOR MOTOR VEHICLES
Filed Nov. 30, 1950 2 Sheets-Sheet 1
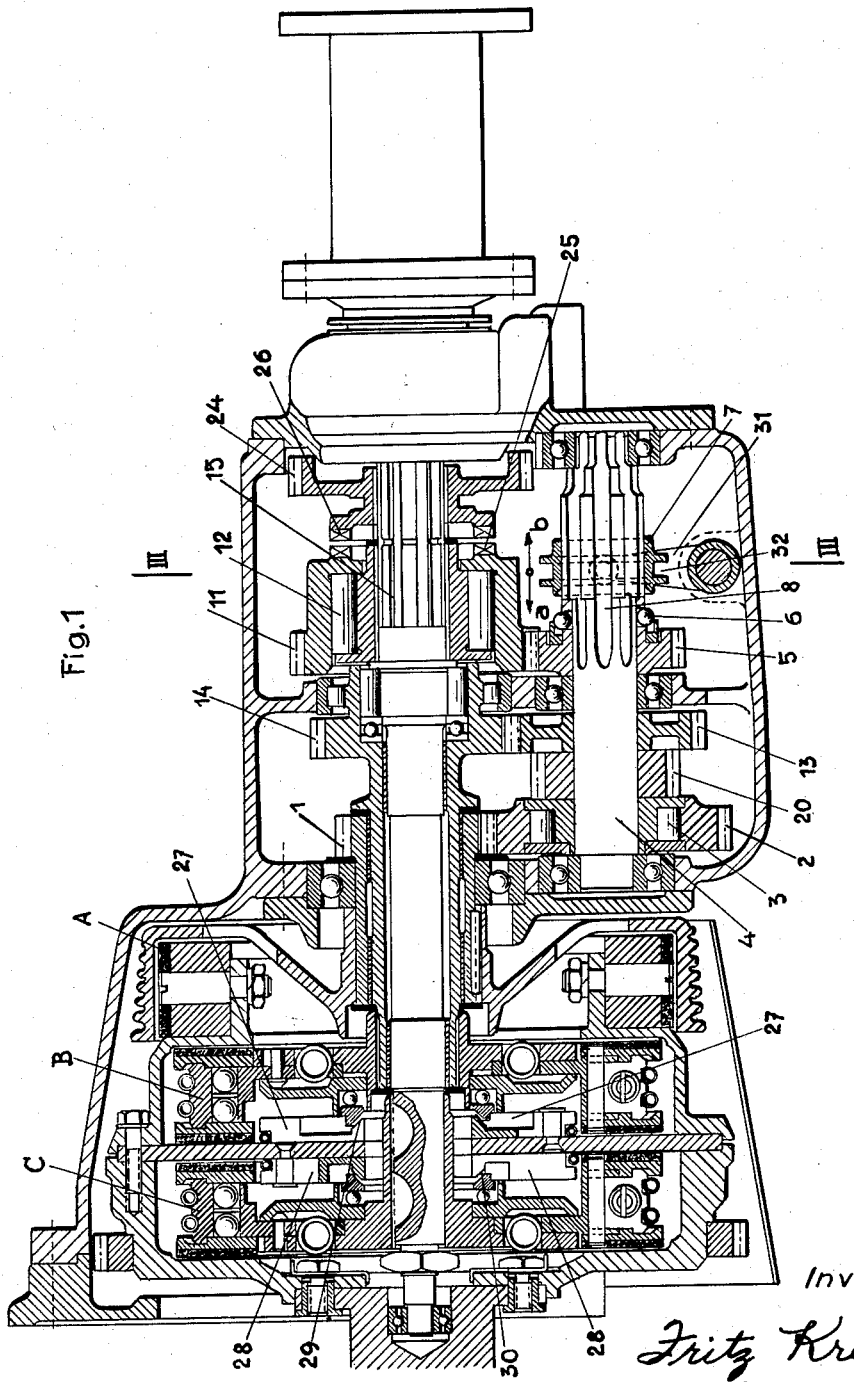
Inventor:
Fritz Kreis
by

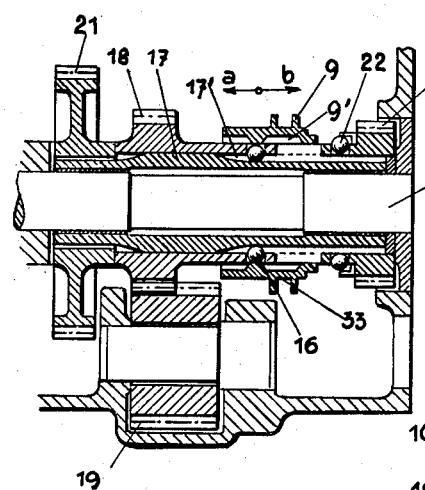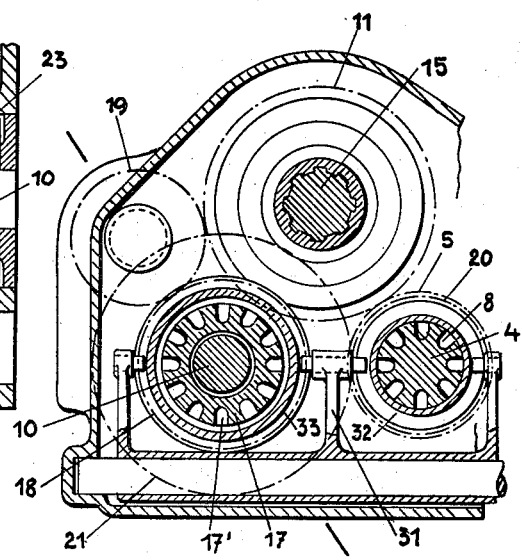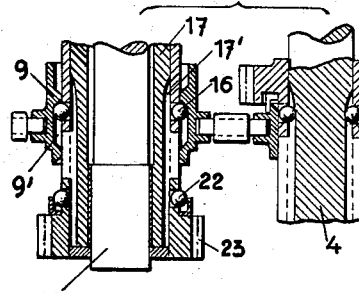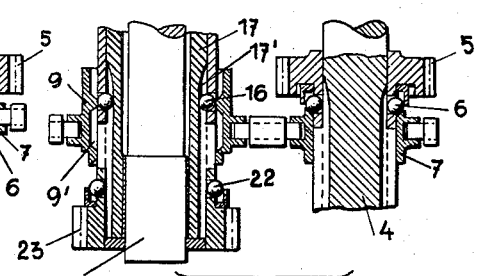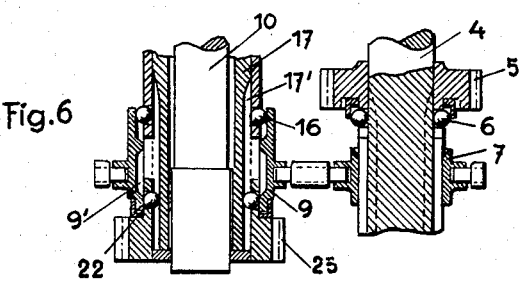

United States Patent Office 2,733,613
Patented Feb. 7, 1956

2,733,613

CHANGE SPEED GEAR FOR MOTOR VEHICLES

Fritz Kreis, Wurzburg, Germany

Application November 30, 1950, Serial No. 198,315

6 Claims. (Cl. 74—336)

The invention relates to change speed gears for motor vehicles and particularly to automatically operating gears, intended for use under all engine load conditions and has for its object to provide an improved gear speed change arrangement suitable for passenger and load carrying vehicles and which has an improved starting performance as compared with known gears of this type.

In recent years there has been a tendency to equip passenger cars with multiple speed gears and so obtain the advantages associated with the use of these gears in load-carrying vehicles. At the present stage of technical development, however, the adoption of multiple speed gears for passenger cars has always been hindered for various reasons, the most important of which is that these gears and their associated parts occupy a considerable amount of space which in a passenger vehicle is, as a general rule, not available.

Whilst for normal everyday requirements, the usual three-stage gear is generally sufficient for passenger cars, it is useful for the driver of such a vehicle, particularly in hilly country, to have at his disposal for instance a five-stage gear instead of the standard three-stage one.

The provision of multiple speed gears in passenger cars is in itself not a new development. The inclusion of such gears in passenger cars, has always however been at the expense of available room, which in many cases might have been utilised for some other purposes or in a much more convenient manner.

The present invention has the object to overcome in an efficient way the obstacles which still exist at the present stage of technical development and which oppose the adoption of multiple speed gears on passenger cars.

An automatic gear speed change arrangement according to the present invention comprises a drive shaft; a driven shaft; automatic gear group shifting means including a counter shaft, at least two automatically operating centrifugal clutch means, two gear means having different ratios and connecting each of the centrifugal clutch means to the counter shaft for driving the same at least two different rotary speeds, one of the gear means including an override clutch means, a group shifting shaft, and further gear means connecting the group shifting shaft to the counter shaft for rotation at a different speed; and coupling means movable between at least two positions for coupling the counter shaft with the driven shaft in the first of the positions and for coupling the group shifting shaft with the driven shaft in the second of the positions.

The centrifugal clutch means include means retarding movement to engaged position at a predetermined speed so that acceleration of the drive shaft by the operator is required for effecting clutch engagement.

The adoption of the group shifting means results in a more compact layout of the multiple speed gear.

It is known that in cases where groups of gears are to be shifted, gear trains of different step down ratios are used, these trains being engaged at will by hand, in such a way that the gear transmits the drive in one instance through one step down ratio and in the other instance through another step down ratio.

In practical embodiments two stages can be put in action at will by using two different step down ratios which, in effect correspond to a four-stage gear. To this must be added the direct stage, giving in all a five-stage gear.

This so-called group shifting device, occupying only a small space, has hitherto only been suggested in association with motorcycle drives. It cannot however be used for four wheeled vehicles in the same form as in motorcycles, since the motor vehicle drive requires that there should be a reversing stage, and that the change speed gear should act in conjunction with the engine as a brake.

In carrying out the invention and for shifting the gear group and the reverse stage, two clutches are associated with the group shifting shaft and one with the countershaft; of these, the two clutches of the group shifting shaft lie axially in line with each other and are controlled by a common coupling member or slide which is movable in an axial direction between these two clutches.

An essential feature is that the control elements for the actuation of the coupling members are rigidly connected with each other, so that, for instance, the operation of the coupling member for the group shifting will also positively bring about actuation of the coupling member for the gear countershaft.

The distribution of the devices controlling the coupling members and the position of the coupling members themsevles are arranged according to the invention in such a way that, upon displacement of the coupling members, the uncoupling of the group shifting shaft corresponds to coupling of the countershaft, and the uncoupling on both shafts corresponds to coupling of the backward stage. The special position of the clutch and the particular construction of the devices for shifting of the gears as well as the rigid connection of the coupling means with the parallel group shifting shaft and countershaft, has the special advantage that the control movements for carrying out the various coupling movements are executed in a rectilinear movement.

This method of gear operation is made much easier for the driver, as compared with the conventional gate type change speed gear which requires more skill on the part of the driver.

According to a further feature of the invention, centrifugal weights are fitted in each clutch and operate under centrifugal force when the gear stage drum exceeds a given revolutional speed so as to move into more or less effective contact with the gear clutch parts.

The employment of the centrifugal weights is under the control of the driver and in view of the entirely automatic operation of the change speed gear, depends upon the extent to which the throttle lever is opened or closed.

The invention is illustrated in greater detail in the accompanying drawing which shows by way of example one embodiment of the invention.

Figure 1 shows a longitudinal section through the change speed gear.

Figure 2 is a section along line III—III of Figure 1.

Figure 3 is a plan view of the change speed gear with the upper casing removed.

Figure 4 shows a clutch position, where the countershaft is coupled.

Figure 5 shows a clutch position, where the countershaft is uncoupled and the group shifting shaft is coupled.

Figure 6 shows a clutch position, where the countershaft and the group shifting shaft are uncoupled and the reverse gear stage is coupled.

The three centrifugal clutches are designated A, B and C. The mode of operation being as follows:

Clutch A is firmly connected with gear wheel 1, which meshes with gear wheel 2 and drives countershaft 4 through free wheel 3. Where a standard three stage gear is employed gear wheel 5 is firmly connected with countershaft 4 by means of the ball coupling 6. This connection is obtained through the axial displacement of coupling sleeve 7 in the direction of arrow a, whereby balls 6 of this coupling means are forced inwardly into axially disposed grooves 8 in the countershaft 4 (Figure 4). Coupling sleeve 7 is now connected through a common drive control with coupling sleeve 9, which can also be displaced in axial direction on the group shifting shaft 10, the latter being parallel to shaft 4, so that coupling sleeve 9 is also displaced together with coupling sleeve 7 in the direction of arrow a.

The coupling sleeve 9 acts in a similar manner to the coupling parts 6, 7 and 8, and employs balls as coupling elements.

This latter clutch arrangement will be hereinafter described in detail.

As soon as the ball coupling of countershaft 4 has taken place, gear wheel 5 is rotatable with countershaft 4 and the drive from the first clutch is taken from gear wheel 5 to gear wheel 11, which engages free wheel 12 and causes drive shaft 15 to rotate. The vehicle may now run in the first speed stage.

When running in this stage, gear wheel 13 is simultaneously driven and, through toothed wheel 14, brings clutch B of the second stage up to the required revolutional speed for shifting.

If clutch B is drivably connected with the engine, then inversely countershaft 4 is driven through gear wheels 14/13 and drive shaft 15 through gear wheels 5/11. Override clutch 3, mounted in gear wheel 2, now permits countershaft 4 to overrun and the vehicle runs in the second speed stage.

As the speed in this stage increases, clutch C of the third or direct stage, which is fitted at the engine end of drive shaft 15, is shifted and as soon as the power action is transmitted, the vehicle runs in direct drive.

Free wheel means 12, mounted in toothed wheel 11, permits the drive shaft 15 to overrun as necessary.

If now a greater step down ratio is desired, as compared with the standard three-stage gear, then the transmission is simply transferred to the group shifting shaft and the latter is included within the power connection. The group shifting shaft carries gear wheels giving a greater step down ratio.

Also in this case, the ball couplings, mounted partly on the group shifting shaft 10, and partly on the countershaft 4, select the desired operation stage, from another step down ratio. The selection of the group shifting is obtained by means of a corresponding axial displacement of coupling sleeve 9.

In the case of the coupling obtained earlier with the standard three-stage operation, the coupling sleeve 7 remained in the position indicated in Figure 4, where it is apparent (from the position of the coupling sleeve 9, which was forced to simultaneously move) that clutch balls 16 have entered into the recess 9' in the inside of clutch sleeve 9, such action corresponding to a disconnection of group shifting shaft 10.

If however the group is now to be shifted, coupling sleeve 9 is transferred from the position shown in Figure 4, in the direction of arrow b, to the position shown in Figure 5.

The consequence of this movement of the clutch sleeve is that balls 16 are pressed by the oblique surfaces in the inside of sleeve 9, into the axially extending grooves 17' of hollow shaft 17, whereby coupling of shaft 17 with gear wheel 18 is obtained.

Countershaft 4, however, is uncoupled at the same time, as can be seen from Figure 5. Gear wheel 18 meshes with one axial half of the double gearing 19, while the other axial half is in mesh with gear wheel 11 of the driver shaft. The drive from countershaft 4 to secondary shaft 17 is transmitted through gear wheels 20, 21.

In this position of the group of gears, the drive from the first speed stage goes from clutch A to the drive shaft, through gear wheels 1, 2, shaft 4 gear wheels 20, 21, gear wheels 18, 19 and finally through gear wheels 19 and 11.

In the second speed stage the drive is transmitted from clutch B to the main drive shaft, through gear wheels 14, 13, shaft 4 gear wheels 20, 21, gear wheels 18, 19 and finally gear wheels 19, 11.

When the reverse gear stage is engaged, the next ball joint 22 upon secondary shaft 10, 17 comes into operation. The displacement of both sleeves 7 and 9 in the direction of arrow b causes disconnection of ball clutches 6 and 16 and connection of ball clutch 22.

Consequently, only gear wheel 23 is connected with countershaft 4 and secondary shaft 17. The drive is now transmitted in an opposite direction from gear wheel 23 to gear wheel 24 and to main shaft 15.

A device for locking the free wheel 12 is provided in order that the engine may be used as a brake. A claw 26 is fitted on gear wheel 24, and engages a frontal claw 25 on gear wheel 11. Gear wheel 11 is now connected to drive shaft 15 and built-in free wheel 12 is ineffective. The engine of the vehicle may thus be used as a brake in the standard gear in the second speed stage, and in the optional gear in the second optional stage.

When the gear is used in passenger cars, the optional drive is available if necessary.

When the gear transmission is fitted in a truck, all speed and road variations can be accommodated by the five stages and the driver is readily able to choose one or other group according to the required road or load conditions. Generally, when driving in level country and if no peak loads are to be conveyed, the three upper stages are used. Only when starting on a steep road or with peak loads, is the lower group first engaged. The same applies also when the gear is used for passenger cars.

For both types of motor vehicles, when using the same engine, the gear transmission of the present invention will fill all requirements.

Centrifugal weights 27, 28 rotate with the clutches B, C.

When the clutches B, C, after having been shifted, exceed a given revolutional speed, and before the clutch connects automatically, the centrifugal weights expand outwardly, under the action of centrifugal force, and, by means of the wedge shaped parts 29, 30, fitted to these centrifugal weights, bring about axial displacement of parts which in turn influence more or less strongly the centrifugal mass of clutches B, C through contracting action.

The driver may now decide whether to accelerate or to delay the beginning of the outward movement of centrifugal weights 27, 28 by opening or closing the throttle, and thereby additionally controlling shifting of clutches B, C. This action is advantageous, particularly when road conditions permit acceleration or require the engagement of a particular speed stage of the gear to be delayed.

The shifting of clutch sleeve 9 or 7 is brought about, according to the example illustrated, by levers 31, which engage within annular grooves 32, 33 in the sleeves 9 or 7. It is thus possible to employ a rectilinear gear shifting motion which is preferable to the usual system, and is advantageous in that it is more simple for the driver to operate.

What I claim is:

1. An automatic gear speed change arrangement comprising, in combination, a drive shaft; a driven shaft; at least two centrifugal clutch means driven by said drive shaft; a countershaft; first gear means including override clutch means connecting one of said centrifugal clutch means with said counter shaft and other gear means connecting the other centrifugal clutch means with said counter shaft, said other centrifugal clutch means engaging at a higher speed than said one centrifugal clutch means; second gear means including override clutch means connected to said driven shaft; a group shifting shaft; third gear means connecting said counter shaft with said group shifting shaft; fourth gear means connected to said driven shaft; and manually operated coupling means movable between at least two coupling positions and coupling in one of said two positions said counter shaft with said second gear means, and in the other of said two positions said group shifting shaft with said fourth gear means.

2. An automatic gear speed change arrangement comprising, in combination, a drive shaft; a driven shaft; at least two centrifugal clutch means driven by said drive shaft and including centrifugal weights, said centrifugal clutch means including means retarding movement of the same into engaged position at a predetermined speed so that acceleration of said drive shaft by an operator is required for effecting engagement of said centrifugal clutch means; a counter shaft; first gear means including override clutch means connecting one of said centrifugal clutch means with said counter shaft and other gear means connecting the other centrifugal clutch means with said counter shaft, said other centrifugal clutch means engaging at a higher speed than said one centrifugal clutch means; second gear means including override clutch means connected to said driven shaft; a group shifting shaft; third gear means connecting said counter shaft with said group shifting shaft; fourth gear means connected to said driven shaft; and manually operated coupling means movable between at least two coupling positions and coupling in one of said two positions said counter shaft with said second gear means, and in the other of said two positions said group shifting shaft with said fourth gear means.

3. An automatic gear speed change arrangement comprising, in combination, a drive shaft; a driven shaft; at least two centrifugal clutch means driven by said drive shaft; a counter shaft; first gear means including override clutch means connecting one of said centrifugal clutch means with said counter shaft and other gear means connecting the other centrifugal clutch means with said counter shaft, said other centrifugal clutch means engaging at a higher speed than said one centrifugal clutch means; second gear means including override clutch means connected to said driven shaft; a group shifting shaft; third gear means connecting said counter shaft with said group shifting shaft; fourth gear means connected to said driven shaft; reversing gear means connected with said driven shaft; and manually operated coupling means movable between three coupling positions, and coupling in one of said three positions said counter shaft with said second gear means, in the second of said three positions said group shifting shaft with said fourth gear means, and in the third of said three positions said group shifting shaft with said reversing gear means.

4. An automatic gear speed change arrangement comprising, in combination, a drive shaft; a driven shaft; at least two centrifugal clutch means driven by said drive shaft; a counter shaft; first gear means including override clutch means connecting one of said centrifugal clutch means with said counter shaft and other gear means connecting the other centrifugal clutch means with said counter shaft, said other centrifugal clutch means engaging at a higher speed than said one centrifugal clutch means; second gear means including override clutch means connected to said driven shaft; a group shifting shaft parallel to said counter shaft; third gear means connecting said counter shaft with said group shifting shaft; fourth gear means connected to said driven shaft; reversing gear means connected with said driven shaft; a first clutch on said group shifting shaft connecting in engaged position said group shifting shaft with said fourth gear means; a second clutch on said group shifting shaft connecting in engaged position said reversing gear means with said group shifting shaft; a third clutch on said counter shaft connecting in engaged position said counter shaft with said second gear means; and a manually operated actuating member extending transversely to and between said counter shaft and said group shifting shaft, said actuating member movable between three positions in a direction parallel to said last mentioned shafts, and engaging in a first position at one end thereof said third clutch for moving said third clutch to engaged position, and engaging in the second position at the other end thereof said first clutch for moving the same to engaged position while releasing said third clutch, and engaging in said third position at said one end thereof said second clutch for moving the same to engaged position while releasing said first and third clutches.

5. An automatic gear speed change arrangement comprising, in combination, a drive shaft; a driven shaft; automatic gear group shifting means including a counter shaft, at least two automatically operating centrifugal clutch means, two gear means having different ratios and connecting each of said centrifugal clutch means to said counter shaft for driving the same at least two different rotary speeds, one of said gear means including an override clutch means, a group shifting shaft, and further gear means connecting said group shifting shaft to said counter shaft for rotation at a different speed; and coupling means movable between at least two positions for coupling said counter shaft with said driven shaft in the first of said positions and for coupling said group shifting shaft with said driven shaft in the second of said positions.

6. An automatic gear speed change arrangement comprising, in combination, a drive shaft; a driven shaft; automatic gear group shifting means including a counter shaft, at least two automatically operating centrifugal clutch means, gear means having different ratios connecting each of said centrifugal clutch means to said counter shaft for driving the same at least two different rotary speeds, one of said gear means including an override clutch means, a group shifting shaft, and further gear means connecting said group shifting shaft to said counter shaft for rotation at a different speed; reversing gear means connected with said driven shaft; and manually operated coupling means movable between three positions for coupling said counter shaft with said driven shaft in the first of said positions and for coupling said group shifting shaft with said driven shaft in the second of said positions, and for coupling said group shifting shaft with said reversing gear means in the third of said positions.

References Cited in the file of this patent

UNITED STATES PATENTS

| | | |
|---|---|---|
| 1,795,135 | Molly | Mar. 3, 1931 |
| 2,034,988 | Nilsson et al. | Mar. 24, 1936 |
| 2,058,736 | Stauffer | Oct. 27, 1936 |
| 2,124,192 | Hanson | July 19, 1938 |
| 2,202,378 | Hertrich | May 28, 1940 |
| 2,386,540 | Campodonico | Oct. 9, 1945 |
| 2,386,541 | Campodonico | Oct. 9, 1945 |
| 2,416,154 | Chilton | Feb. 18, 1947 |
| 2,500,308 | Campodonico et al. | Mar. 14, 1950 |
| 2,534,134 | Kirkpatrick | Dec. 12, 1950 |
| 2,604,197 | Livermore | July 22, 1952 |